United States Patent
Schultz et al.

(10) Patent No.: US 6,952,820 B1
(45) Date of Patent: Oct. 4, 2005

(54) DATA COMPACTION METHOD FOR AN INTERMEDIATE OBJECT CODE PROGRAM EXECUTABLE IN AN ONBOARD SYSTEM PROVIDED WITH DATA PROCESSING RESOURCES AND CORRESPONDING ONBOARD SYSTEM WITH MULTIPLE APPLICATIONS

(75) Inventors: Ulrik Pagh Schultz, Rennes (FR); Gilles Muller, Acigne (FR); Charles Consel, Retiers (FR); Lars Clausen, Urbana, IL (US); Christian Goire, Les Clayes sous Bois (FR)

(73) Assignees: Bull CP8, Louveciennes (FR); INRIA-Institut National de la Recherche en Informatique et en Automatique, Le Chesnay (FR)

( * ) Notice: Subject to any disclaimer, the term of this patent is extended or adjusted under 35 U.S.C. 154(b) by 0 days.

(21) Appl. No.: 09/582,939

(22) PCT Filed: Nov. 4, 1999

(86) PCT No.: PCT/FR99/02696

§ 371 (c)(1),
(2), (4) Date: Oct. 27, 2000

(87) PCT Pub. No.: WO00/28416

PCT Pub. Date: May 18, 2000

(30) Foreign Application Priority Data

Nov. 6, 1998 (FR) .................................. 98 14012

(51) Int. Cl.[7] .............................. G06F 9/45; G06F 7/38
(52) U.S. Cl. ...................... 717/151; 717/152; 717/159; 717/147; 717/146; 712/245
(58) Field of Search ............................... 717/151, 152, 717/159, 147, 146; 712/245

(56) References Cited

U.S. PATENT DOCUMENTS 5,442,790 A * 8/1995 Nosenchuck ................. 717/159

(Continued)

FOREIGN PATENT DOCUMENTS

AU          733631         7/1998

OTHER PUBLICATIONS

F. Vahid, "A Three-Step Approach to the Functional Partitioning of Large Behavioral Processes", 1998, IEEE, p. 152-157.*

(Continued)

*Primary Examiner*—Todd Ingberg
*Assistant Examiner*—Qamrun Nahar
(74) *Attorney, Agent, or Firm*—DLA Piper Rudnick Gray Cary US LLP

(57) ABSTRACT

The invention concerns a data compaction method and system for an intermediate program. The method consists in searching the program (1000) for identical sequences (Si) and counting Ni number of occurrences of each sequence (Si), a comparison test (1001) to find the superiority of a function f(Ni) to a reference value enables to generate (1003) a specific instruction of a specific code (Ci) with which the sequence (Si) is associated, replacing (1004) each occurrence in the sequence (Si) by the specific code (Ci) in the intermediate program to create a compacted intermediate program (FCC) with which an executing file (FEX) is associated. The invention is applicable to multiple application portable objects such as microprocessor cards, onboard systems of the like.

11 Claims, 9 Drawing Sheets

U.S. PATENT DOCUMENTS

| | | | | |
|---|---|---|---|---|
| 5,493,675 A | * | 2/1996 | Faiman et al. | 717/151 |
| 5,836,014 A | * | 11/1998 | Faiman, Jr. | 717/159 |
| 6,260,190 B1 | * | 7/2001 | Ju | 717/156 |
| 6,263,429 B1 | * | 7/2001 | Siska | 712/245 |
| 6,308,317 B1 | * | 10/2001 | Wilkinson et al. | 717/139 |

OTHER PUBLICATIONS

Tanenbaum, et al., "Using Peephole Optimization on Intermediate Code", 1982, ACM, p. 21-36.*

Debaere, E. H., "A Language Coprocessor for the Interpretation of Threaded Code" Microprocessing and Microprogramming, vol. 21, (1987), pp. 593-602.

Accomazzo, E. et al., "Integrating Intermediate Code Optimization with Retargetable Code Generation" Microprocessing and Microprogramming, vol. 30, (1990), pp. 475-482.

Biget, P. et al., "How Smart Cards Can Benefit from Object-oriented Technologies" Future Generations Computer Systems, vol. 13, (1997), pp. 75-90.

Vahid, Frank, "Procedure Exlining: a New System-Level Specification Transformation" IEEE, 1995, pp. 508-513.

* cited by examiner

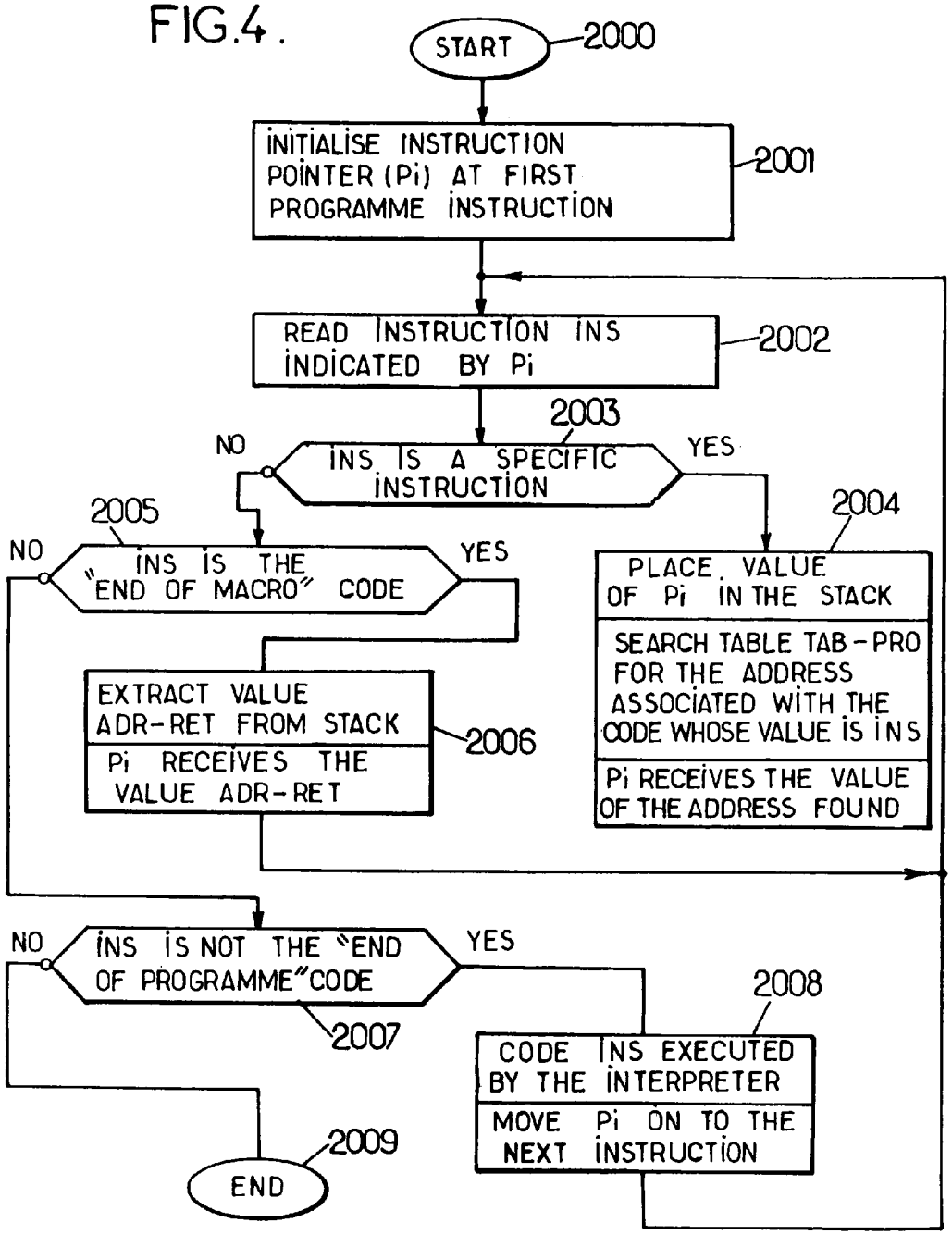

DATA COMPACTION METHOD FOR AN INTERMEDIATE OBJECT CODE PROGRAM EXECUTABLE IN AN ONBOARD SYSTEM PROVIDED WITH DATA PROCESSING RESOURCES AND CORRESPONDING ONBOARD SYSTEM WITH MULTIPLE APPLICATIONS

FIELD OF THE INVENTION

The present invention relates to a method of compacting a program of the intermediate object code type, which can be run in an on-board system provided with data processing resources, and to the corresponding compaction method.

BACKGROUND OF THE INVENTION

These days, on-board systems provided with data processing resources enable increasingly complex and larger numbers of functions to be performed because the hardware used for these portable objects and their software, or more specifically the application programs embedded in the latter as a means of enabling them to run one or more specific functions, are constantly being optimised. The concept of on-board system covers any portable computer system, such as a portable object, microprocessor card or similar, as opposed to a conventional microcomputer.

This is particularly so in the case of microprocessor cards, also known as chip cards, such as that illustrated in FIG. 1a, used in conjunction with a compiler to generate instructions and an interpreter which enables these instructions to be run by the microprocessor, as illustrated in FIG. 1b. Conventionally, as illustrated in FIG. 1a, a microprocessor card 10 comprises an input/output system 12 linked to the microprocessor 14, a RAM memory 16, a non-volatile memory 18 comprising a read only ROM memory 18b and a programmable memory 18a. All of these elements are linked to the microprocessor 14 by a BUS line. A data encryption/decryption module 20 may be provided, as required.

FIG. 1c illustrates all the application software elements, such as electronic purse, electronic commerce or health, embedded in the non-volatile programmable memory, the interpreter in a non-volatile programmable memory or a read only memory and the operating system in a read only memory ROM.

The intermediate object code is generated by the compiler from a source program, usually written in high level language based on ASCII characters. The source program and the corresponding intermediate object code may be run by all the standard microprocessors because the interpreter ensures that the standard instructions of the intermediate object code are translated, in software terms, into instructions that can be directly executed by the microprocessor.

By way of example, although this is not restrictive, microprocessor card manufacturers have recently developed interpreters embedded in the read only memory ROM. This type of interpreter reads in sequence a program or intermediate object code, supporting an application for example, which is loaded into the programmable memory of the microprocessor card, for example. Each standard instruction of this intermediate object code is interpreted by the interpreter, then run by the microprocessor. As a general rule, the standard instructions of the intermediate object code enable changing functions to be processed, such as arithmetic processing and object manipulation. The object concept relates to computed objects such as lists, data tables or similar.

However, due in particular to the fact that these microprocessor cards are portable in nature, the size and space occupied by the latter are limited. The same applies to the size of their programmable memory, which is limited, by construction, to several kilobytes. This structural limitation makes it impossible to run large application programs.

Furthermore, the current tendency to use multi-application on-board systems is faced with the recurring problem caused by the fact that the number of applications installed on a same on-board system or microprocessor card rarely exceeds three applications.

OBJECTS OF THE INVENTION

The objective of this invention is to overcome the disadvantage outlined above by running a method for compacting a program of the intermediate object code type, which can be used in an on-board system of the microprocessor type in order to free up memory space in the programmable memory of this on-board system, thereby enabling at least one additional application to be embedded once the latter has been compacted.

Another objective of this invention is to implement a system of compacting programs of the intermediate object code type which will allow a program of the compacted intermediate object code type to be embedded in a multi-application, on-board system having data processing resources that will allow compacted program s of the intermediate object type to be run without significantly altering the running time and to do so in total transparency with regard to the process inherent in each non-compacted application.

SUMMARY OF THE INVENTION

The method of compacting a program of the intermediate object type proposed by the invention, which consists of a sequence of standard instructions, this on-board system being provided with a memory and a program language interpreter capable of turning intermediate object code into instructions of an object code that can be run directly by a microprocessor and this program normally being stored in the memory of this on-board system, is remarkable because the intermediate object code program is searched in order to find identical sequences of successive standard instructions and the identical sequences of successive standard instructions are subjected to a comparison test to find a function, based on at least the number of occurrences of these sequences in the intermediate object code program, that is higher than a reference value. If the above-mentioned test returns a positive response, a specific instruction is generated for each identical sequence of successive standard instructions which satisfies the test step, by defining a specific operating code and associating this specific operating code with the sequence of successive standard instructions. In addition, each occurrence of each sequence of standard successive instructions in the stored intermediate object code program is replaced by the specific operating code associated with it to obtain a compacted intermediate object code program, a series of standard instructions and specific operating codes. A decompression table is stored in the memory which enables a reciprocal link to be made between each specific operating code inserted and the sequence of successive standard instructions associated with the latter. This process enables the memory space occupied by the compacted intermediate object program to be optimised by storing only one occurrence of identical sequences of successive standard instructions in the programmable memory.

The method, the system of compacting an intermediate object code program and the corresponding multi-application on-board system proposed by this invention may be used in the technical field of on-board systems, more specifically for running and managing microprocessor cards.

BRIEF DESCRIPTION OF THE DRAWINGS

They will be more readily understood from the description below and the appended drawings, in which:

FIG. 4 shows, as an illustrative example, a compacted intermediate object code program, as proposed by the invention, embedded in a non-volatile programmable memory of a microprocessor card or on-board multi-application system;

MORE DETAILED DESCRIPTION

The method of compacting an intermediate object code program as proposed by this invention will now be described with reference to FIG. 2a. The terms intermediate object code program cover any intermediate program for the purpose of this patent application.

Figure 1A:
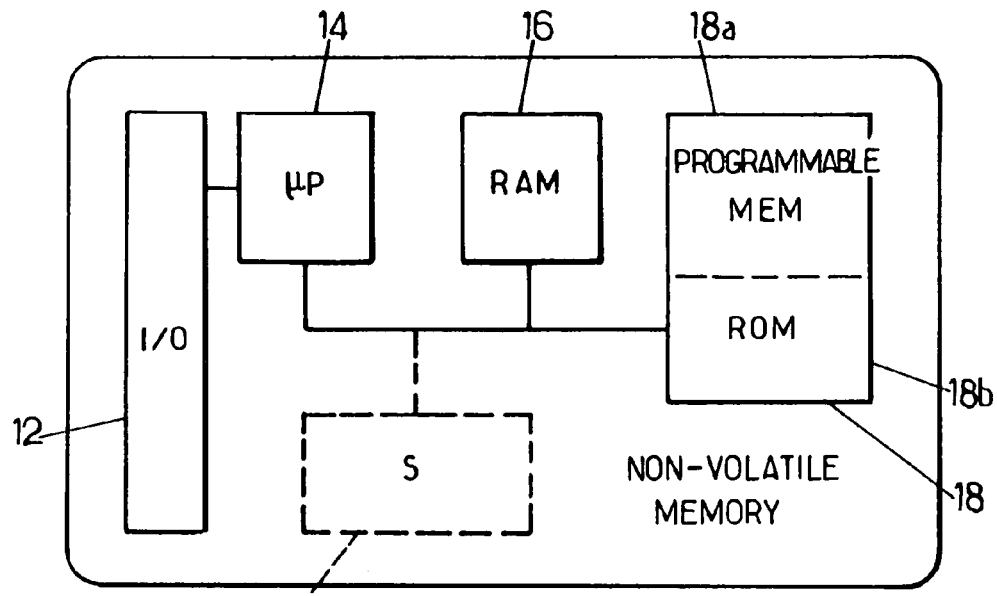
FIG. 1a illustrates microprocessor cards of prior art.
Figure 1B:
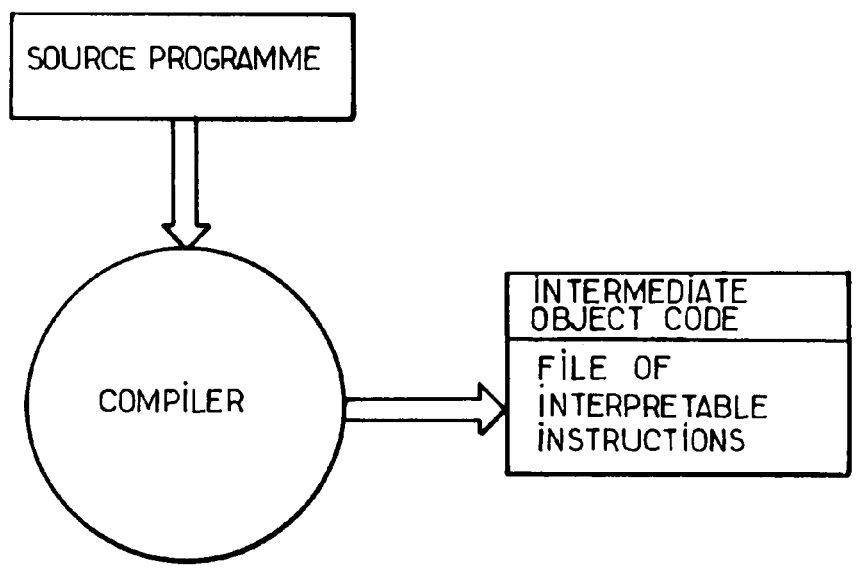
FIG. 1b illustrates the conjunction of a compiler, an interpreter, and instructions to be run by a microprocessor, according to prior art.
Figure 1C:
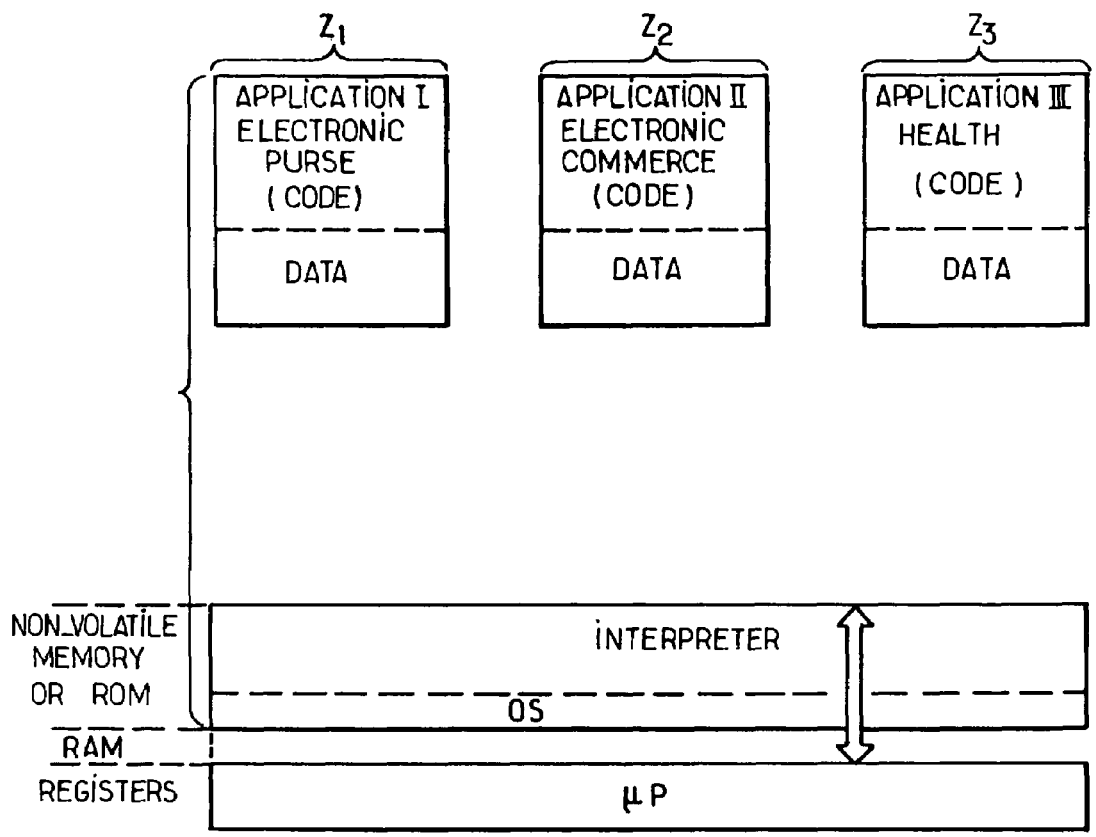
FIG. 1c illustrates application software elements of prior art.

This method will be described with reference to running an on-board system consisting of a microprocessor card of the type illustrated in FIG. 1a for example, although this example is not restrictive, this intermediate object code program being obtained in a conventional manner, as illustrated in FIG. 1b, a plurality of applications embedded in the programmable memory of the interpreter and the operating system OS in the ROM memory being illustrated in FIG. 1c, although again this is not restrictive.

The intermediate object code program consists of a series of standard instructions which can be run by the microprocessor through the interpreter.

Figure 2A:
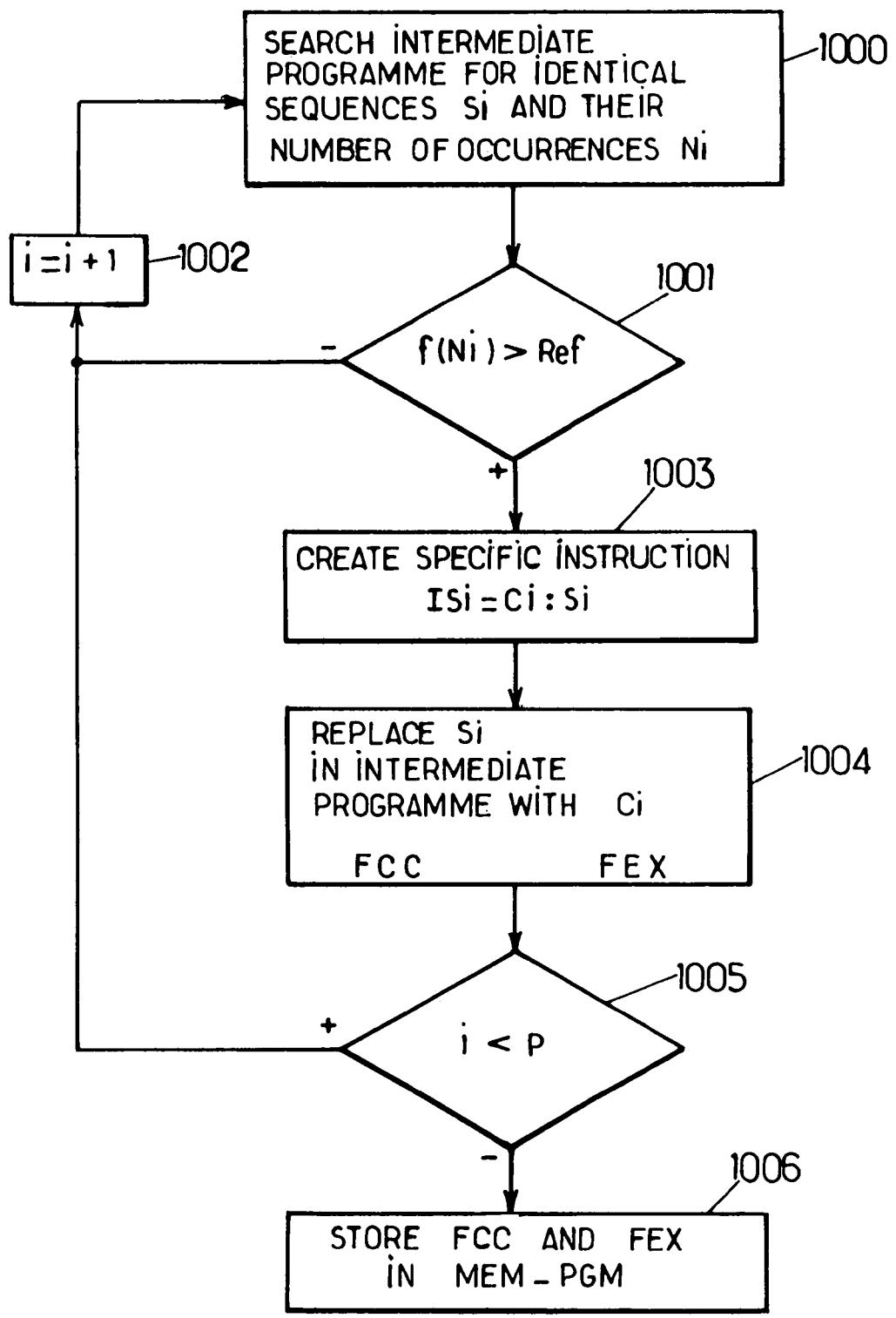
FIG. 2a is a general flow chart illustrating a method of compacting an intermediate object code program as proposed by this invention.

The method of compacting a program of this type consists in firstly embedding the latter in the programmable memory 18a, searching the intermediate object code program at a step 1000 as illustrated in FIG. 2a for identical sequences of successive standard instructions, these identical sequences being shown by Si. By identical sequences is meant a sequence of a given number n of octets likely to appear on a repetitive basis in the above-mentioned intermediate object code program. Accordingly, the rank i of identical sequences indicates separate sequences for different values of i. Furthermore, the search step 1000 mentioned above consists in determining the number of occurrences $N_i$ of each said identical sequence $S_i$. At the end of the search step 1000, a plurality of identical sequences $S_i$ will have been found, each sequence $S_i$ being separate, and a number $N_i$ representing the number of occurrences of each of the sequences $S_i$ in the intermediate object code program.

After said step 1000, the compacting method proposed by the invention consists in subjecting, at a step 1001, the identical sequences of successive standard instructions $S_i$ to a comparison test of a function $f(N_i)$ based on at least the number of occurrences $N_i$ associated with an identical sequence $S_i$. In FIG. 2a, the comparison test is written:

$$f(N_i) > Ref.$$

If the response to the test 1001 is negative, in which case the function of at least the number of occurrences $N_i$ is not greater than the reference value, the test 1001 is applied to the next identical sequence, of rank i+1, the index i being incremented at step 1002.

The steps 1000, 1001 and 1002 illustrated in FIG. 2a therefore enable a search to be run in the intermediate object code program for identical sequences or series of octets or, at the very least, a given significant number of these identical sequences, as will be described farther on in the description.

If the response to said test 1001 is positive, the compacting method proposed by the invention then consists in generating a specific instruction, denoted by $IS_i$, by defining a specific operating code, denoted by $C_i$, and associating with this specific operating code the sequence of successive standard instructions which satisfied the test, this being the sequence of successive standard instructions $S_i$. In FIG. 2a, the step by which specific instructions are set up is written:

$$IS_i = C_i : S_i.$$

It should be pointed out that the step of defining a specific operating code and associating it with the sequence of successive standard instructions $S_i$ may consist in assigning a code value and associating this code value with said sequence of instructions $S_i$ in the form of a list, for example.

After step 1003, the compacting method then moves on to step 1004, at which each occurrence of the sequence of successive standard instructions $S_i$ in the intermediate object code program is replaced by the specific operating code $C_i$ which is associated with it in order to obtain a compacted object code program, denoted by FCC, which is a succession of standard instructions and specific operating codes $C_i$.

The replacement process can then be reiterated for each identical sequence or series of standard instructions $S_i$ as long as the index i is lower than a number P of identical sequences, whereby a comparison test 1005 of the index i with the value P will prompt a return to step 1002 at which the index i described above is incremented whenever the response to this test is positive.

In particular, it should be pointed out that by iterating the replacement process set up in this manner, a compacted object code program will be obtained with which an execution file for the latter is associated, this file being denoted by FEX, the execution file consisting of at least one reciprocal match between each specific code $C_i$ and said sequence of successive standard instructions $S_i$.

Once the two above-mentioned files have been obtained, being the compacted intermediate object code program and execution file, on a negative response to test 1005 for example, a storage process can be initiated, whereby said intermediate object code program FCC obtained and of course the execution file FEX described above are stored in the programmable memory 18*a*, for example. Said storage may be in the non-volatile memory 18, programmable memory 18*a* or even in the read only memory 18*b*, although this is not restrictive.

As far as said comparison test 1001 is concerned, it should be pointed out that the function of at least the number of occurrences of each identical sequence $S_i$ may be defined so as to optimise the gain in compression thus achieved. In one embodiment, which is not restrictive, this function may be set up so that a comparison is made between the size of each identical sequence of successive standard instructions and a threshold value, expressed as a number of standard instructions, for example.

Figure 2B:
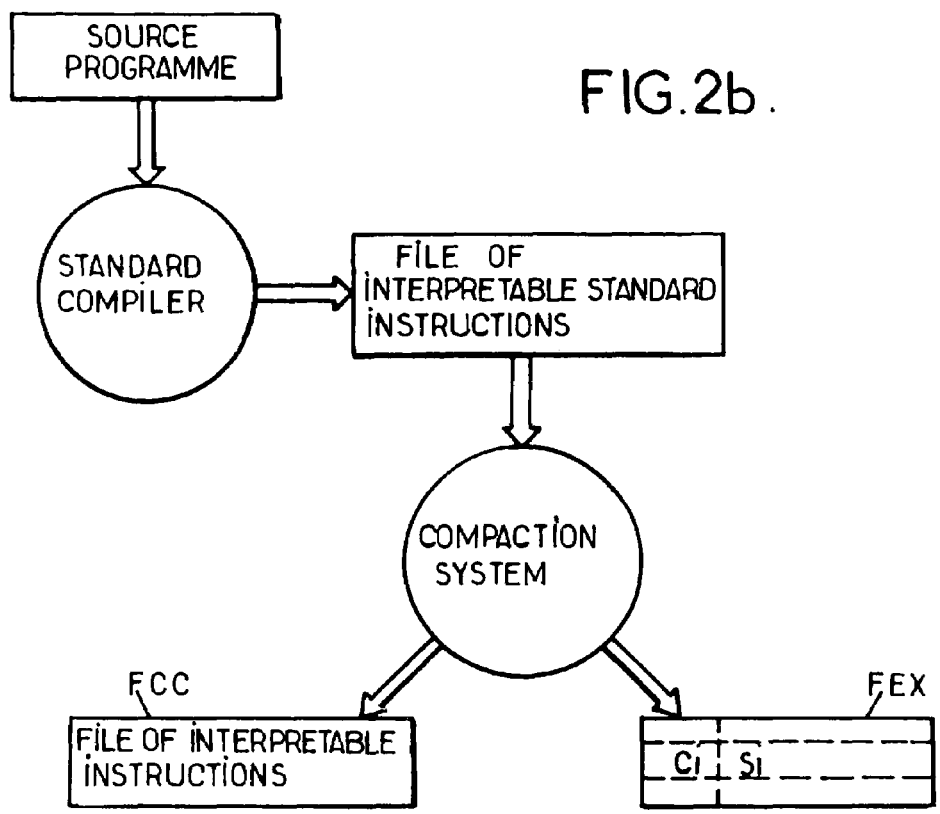
FIG. 2b is a synoptic diagram illustrating how the different operators needed to obtain a compacted intermediate object code program and parameters enabling this program to be decompressed or executed, are applied.

FIG. 2*b* provides an illustrative example of an operating mode which allows a compacted intermediate object code program to be generated using the method proposed by the invention.

During an initial stage, the creator of the intermediate object code program sets up a text file containing the source program. This program, put together by the latter on the basis of an evolved language, is generally written in ASCII code so that it can be easily read and can contain comments to facilitate understanding on the one hand and development of the latter on the other. The source program thus created is inserted in a compiler of the conventional type, known as a standard compiler, the purpose of which is to transform each program line into executable instructions or, at the very least, into instructions which can be interpreted in order to obtain an intermediate object code program consisting of a standard sequence of instructions that can be interpreted by the interpreter.

The intermediate object code file thus obtained after the compilation process is placed in a compression system allowing the compacting method to be run as described above with reference to FIG. 1. This compression system will be explained later in the description.

The compaction process applied and described above will then produce a file of interpretable instructions FCC, i.e. the file constituting the compacted intermediate object code program and the execution file FEX mentioned earlier in the description.

The operating mode of the compression system will be described below with reference to a specific example.

Firstly, the compactor system analyses all the standard instructions $I_s$ and draws up a list of all the series of standard instructions existing in the file forming this latter.

If said file contains 1000 octets, for example, the compactor system launches a search procedure on all the series of at least two octets up to a number Q, for example. Said search may be run for series of two octets, then three octets and so on up to Q octets. In a preferred embodiment, the value of the number Q was 500.

Consequently, for every sequence of instructions $S_i$, made up of a series of standard instructions $I_s$, the compactor system determines whether this sequence $S_i$ is already contained in the list. If such is the case, the compactor system adds one unit to the number of occurrences $N_i$ of said sequence $S_i$.

By the end of said search process, the compactor system will have generated a complex list containing all the instruction sequences $S_i$ examined, each sequence having a number of occurrences $N_i$ in the relevant intermediate object code program assigned to it.

An illustrative table is given below for an intermediate object code program made up of the following series of instructions:

1-7-3-5-7-3-7-3-5-7.

Whereas for the purpose of the illustration given in the table, TABLE I below, said series of instructions contains ten instructions, each instruction being represented by one octet and illustrated by a digit from 1 to 7, the successive sequences of instructions examined comprise 2, 3, 4 then 5 octets.

The successive instruction sequences $S_i$ which occur in said intermediate object code program a number of times greater than or equal to two, are given in the table below.

TABLE 1

| 4 octets | [7-3-5-7]:2 |         |         |
|----------|-------------|---------|---------|
| 3 octets | [7-3-5]:2   | [3-5-7]:2 |         |
| 2 octets | [7-3]:3     | [3-5]:2 | [5-7]:2 |

Secondly, the compactor system replaces certain sequences $S_i$ of TABLE I by a code denoting specific instructions.

The code for specific instructions $C_i$ is determined chronologically on the basis of the first code corresponding to a standard instruction. In a commonplace intermediate object code, there are currently 106 standard instructions and the codes for these instructions fall between 000 and 105. The first specific instruction code $C_i$ can then have the value 106, the second value 107 and so on. Whenever the identical sequences of instructions $S_i$ are replaced by a new specific instruction code $C_i$, once such an operation has been completed, the list illustrated in the table above is then re-computed.

By way of non-restrictive example and in the case where the 4-octet sequence of instructions, the sequence 7-3-5-7, shown in the table above is replaced and a corresponding code 106 is allocated, the compacted intermediate object code program becomes:

1=106-3-106.

Under these conditions, a sequence of standard instructions $I_s$ and specific instructions IS existing in identical form at least twice no longer exist. Clearly, the file constituting the compressed intermediate object code program FCC and the execution or decompression file for this latter are stored at the level of the compactor system mentioned above.

Once the compacting operation has been performed by the compactor system, there exists an intermediate object code program, strictly speaking, which can be executed by the target system, and said execution file FEX. The former contains the standard instructions $I_s$ and the specific instructions IS whilst the latter comprises at least one table allowing the specific codes $C_i$ to be linked with the sequences of standard instructions $S_i$ replaced by said specific codes. Clearly, these two files may be regrouped into one and the same file with a view to transferring the latter to the intended target system. i.e. the microprocessor card designed to receive it.

With regard to the execution file FEX, it should be pointed out that it contains at least one file, shown by MEM-SEQ, made up of a succession of several fields such as a specific code $C_i$ field, a sequence field $S_i$, as outlined above.

Following said operation, the single file or, as applicable, the two above-mentioned files, are transmitted to the target system and processed directly by a loading program. This loading program is mainly responsible for writing the data received to the programmable memory 18a or the read only memory 18b so that it can effectively be run subsequently.

As a non-restrictive example, the file relating to the compacted intermediate object code program FCC is stored, without processing, in said programmable memory 18a starting at a given address, denoted by ADR-MEM-PGM.

As for the execution file FEX, the loading program analyses the data of this file and dynamically creates a table, denoted by TAB-PRO, enabling the specific instruction codes $C_i$ to be associated with the series of instructions. In fact, the table TAB-PRO enables a reciprocal match to be made between said specific instruction codes $C_i$ and an embedding address which enables the corresponding instructions to be run.

Figure 2C:
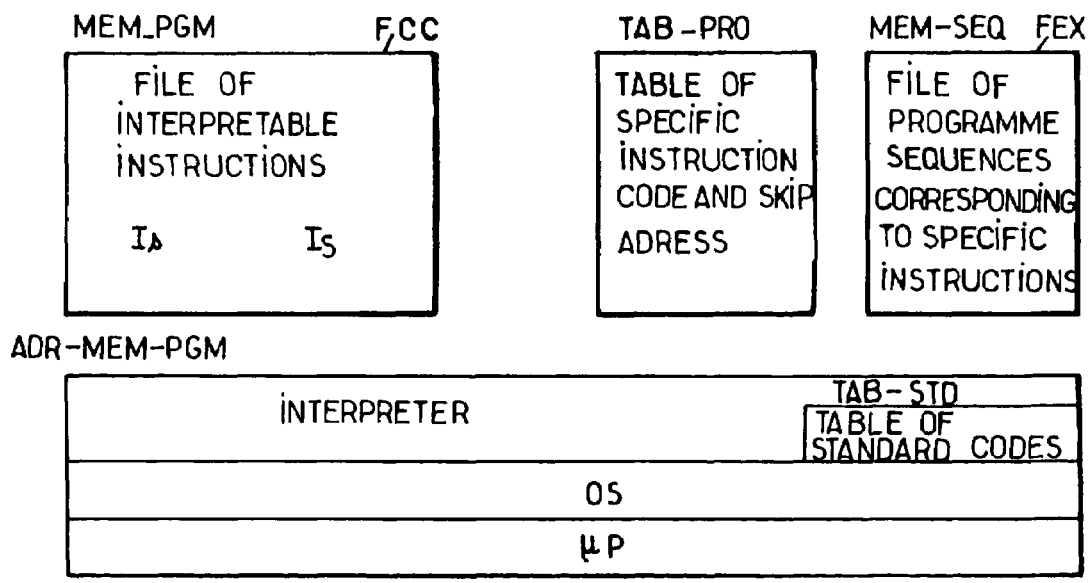
FIG. 2c, given purely as an illustration, shows this compacted intermediate object code program embedded in a programmable non-volatile memory of a microprocessor card and the parameters used to decompress and run the latter.

FIG. 2c illustrates the embedding on the one hand of the support file for the compacted intermediate object code program FCC, the execution file FEX and the file TAB-PRO mentioned above, this latter file having been created by the loading program in the programmable memory 18a of the microprocessor card.

In this drawing, whilst the table of codes for standard instructions $I_s$ is stored at the level of the interpreter in a table TAB-STD, it is in the programmable memory 18a that the execution file FEX and the file TAB-PRO are stored, enabling the address skips to be linked to the corresponding specific instruction codes $C_i$, these two tables therefore enabling the compacted intermediate object code program FCC to be run effectively at the level of the microprocessor of the target unit. An executable unit is therefore provided which can be run by the interpreter under conditions that will be explained blow.

Before moving on to explain how a compacted intermediate object code program FCC is run, a detailed description will be given of the structure of the execution files FEX and the file TAB-PRO and the functional relationship between these latter, with reference to FIGS. 3a and 3b.

Figure 3A:
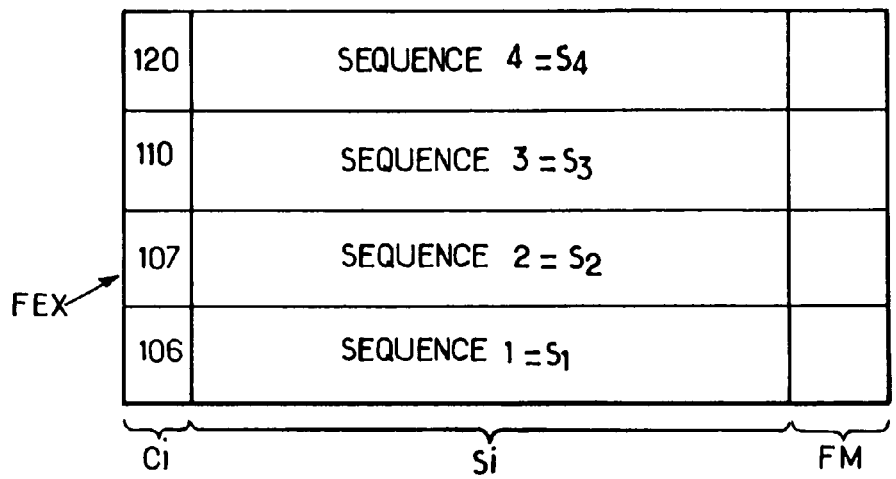
FIG. 3a is a diagram of one specific embodiment, although this is not restrictive, of the structure of a first file made up of the parameters for running or decompressing this intermediate object code program.
Figure 3B:
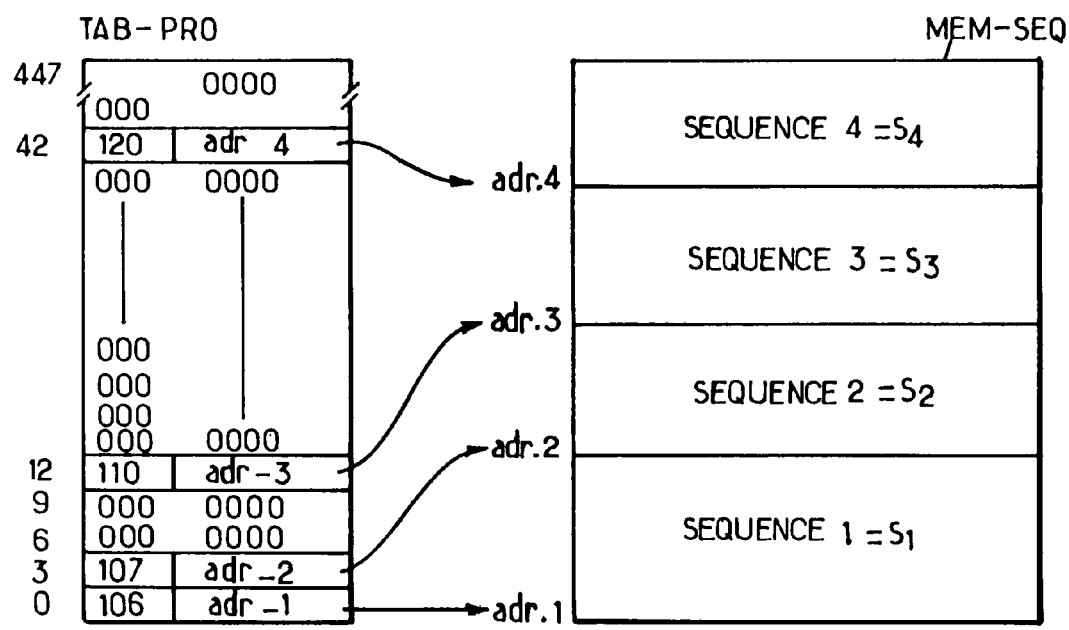
FIG. 3b is a diagram showing one specific embodiment, although this is not restrictive, illustrating the structure of a second file made up of these parameters for running or decompressing this intermediate object code program.

FIG. 3a provides a detailed illustration of the execution file FEX, which, as explained above, has, in addition to the fields for specific codes $C_i$ and instruction sequences $S_i$, a field to denote the end of macro-instructions, denoted by FM, indicating the end of said sequence. In a preferred although not restrictive embodiment, each specific code $C_i$ may be inserted at the beginning of the field, on one octet for example, after which each corresponding sequence $S_i$ is inserted in a second field of variable length. The end of macro code FM is of the standard type and corresponds to that used in the conventional languages mentioned earlier in the description.

When an execution file FEX is received whose data structure corresponds to that illustrated in FIG. 3a, for example, the different fields $C_i$, $S_i$ and FM are processed separately.

Firstly, the specific code $C_i$ of the corresponding specific instruction IS is written to the file TAB-PRO and the sequence of instructions $S_i$ associated with this specific code constituting said specific instruction is written to a file or memory denoted by MEM-SEQ from an address denoted by ADR-1. This code $C_i$ for the corresponding specific instruction is written to the address TAB-PRO+3×(CODE-106). In this relation, the address TAB-PRO is specified as being the address at which the file TAB-PRO is opened whilst the value CODE represents the numerical value of the corresponding code $C_i$. The operating mode illustrated in FIG. 3b corresponds to an address value TAB-PRO which is arbitrarily set at 0, the first specific code allocated having the value 106 and the following successive specific codes allocated having the values 107 and so on. FIG. 3b shows only four specific codes 106, 107, 110 and 120 in order to facilitate understanding, the other memory spaces being filled with arbitrary values.

Under these conditions, Adr-i is the first available address in the memory MEM-SEQ, this address corresponding to the address Adr-1 for the first sequence of instructions $S_i=S_1$. From this first address, which constitutes the opening of the file in the memory MEM-SEQ, the sequences of instructions $S_i$ are therefore written in sequence in the order in which they are loaded. The end of macro code FM is also written at the end of the corresponding reading series.

After said process of writing to the memory MEM-SEQ and after a step to check that the writing process has proceeded correctly, the loading program writes to the table TAB-PRO after each specific code $C_i$ the value of the address at which the sequence was written in the memory MEM-SEQ. The loading program then re-computes a new write address for the next sequence $S_i$ of rank i, incremented or decremented depending on the mode used to run through said sequences of instructions $S_i$.

An execution process of a compacted intermediate object code program supported by a file FCC as described above and containing specific instructions will now be described with reference to FIG. 4.

Such a program is run by means of the interpreter with the aid of an instruction pointer, denoted by PI. In fact, the instruction pointer PI reads the code of the instruction to be carried out, standard instruction Is or specific instruction IS, and applies this code to the interpreter which then triggers the actions corresponding to it.

At the start of running a program, the instruction pointer PI is loaded with the address from which this program starts, i.e. the address ADR-MEM-PGM.

The interpreter analyzes the value of the code read by the instruction pointer PI. As part of this analysis, the latter determines whether this code value corresponds to a standard type code Cs or, if not, to a specific code $C_i$. This operation is run from the table TAB-STB stored at the level of the interpreter and by associating the standard instruction codes and hence the standard instructions Is with the execution addresses in its program.

If the value of the code read is not in the latter table, the interpreter issues a call to read the table TAB-PRO in order to check for the existence of the code value read in the latter table. If the code read is no longer in this latter table, the interpreter will be unable to run the instruction read and the program run will be halted, prompting an error message, not illustrated in the flow chart of FIG. 4.

In said FIG. 4, 2000 denotes the start of the execution operation, 2001 the operation by which the instruction pointer PI is initialised on the first program instruction and 2002 an operation whereby the instruction indicated by the instruction pointer PI is read. This operation in fact corresponds to the process of reading said code value.

In the same manner, at step 2003 in FIG. 4, a check is run to determine whether the code value read in the table belongs or does not belong to the standard codes TAB-STB and whether this code value read belongs to the table TAB-PRO, this process in effect forming said test 2003, after which a distinction is made as to whether the instruction INS read is a standard instruction Is or a specific instruction IS. FIG. 4 does not illustrate the situation in which the code read does not belong as explained above and the other of the two tables which generates an error message, so as not to overload the drawing.

If a positive response is received to said test 2003 and the code read corresponds to a specific instruction, the instruction pointer PI is computed and stored in the stack so that it can then move on to the next instruction. The interpreter reads from the table TAB-PRO the value of the address for the sequence of instructions $S_i$ associated with the specific code $C_i$ read and initialises the value of the instruction pointer PI with this value. All of these operations are shown under reference 2004 in FIG. 4. Following said step 2004, the interpreter loops back to the step of reading the code, as illustrated in FIG. 4, by returning to step 2002.

If a negative response is received to test 2003 and the code read corresponds to an instruction of the standard type Is, the interpreter will check in a test step 2005 whether the value for this code corresponds to an end of macro value representing an end of sequence. If such is the case, the value previously stored in the stack memory is extracted and the stack is updated, this value being loaded into the instruction pointer PI. The operation of extracting the value previously stored in the stack constituting a return address, followed by an update of the stack, is illustrated at 2006, the return address being denoted by ADR-RET. After said step 2006, the interpreter loops back to the process at the step where the code value is read, i.e. step 2002. If a negative response is received to test 2005 and the value of the code read corresponds to an instruction of the standard type but does not correspond to an end of macro or end of series, then the code is run by the interpreter in a manner known per se. However, as illustrated in FIG. 4, a test step 2007 is provided in this case prior to actually running said standard instruction. Test 2007 consists in checking that the value for the code and the corresponding instruction INS does not correspond to that for an end of program. If a positive response is received to said test 2007, the execution step 2008 is then run for this instruction by the interpreter, this execution step being associated with a step by which the instruction pointer is incremented so that it will point to the next instruction. After said step 2008, the interpreter loops back to the step at which the code value indicated by the instruction pointer PI is read, i.e. the reading step 2002.

If a negative response is received to test 2007, in which case the instruction corresponds to an end of program instruction, and end step 2009 is run. In this case, the interpreter halts its action and hands over to the operating system OS. It then waits for a new command instruction.

The embodiment and method of implementing the process of running a compacted intermediate object code program as described with reference to FIG. 4 is not restrictive.

Firstly, it should be pointed out that the stack memory may be subdivided into two separate stack memories, one stack memory for the standard instructions Is and one stack memory for the specific instructions IS, alternatively referred to as macro instructions. In an embodiment of this type, the maximum number of specific instructions IS interleaved within the procedures is known. In order to obtain the total size occupied by this stack, it is sufficient to multiply by the maximum number of interleaved procedures. Using a separate stack memory for the specific instructions IS reduces the total memory consumption as compared with using a single stack.

Furthermore, in order to increase the number of specific instructions IS which may be used instead and in place of the limited number of specific instructions between 106 and 255, in the example described earlier in the description by way of illustration, the specific codes $C_i$ can advantageously be encoded on two octets. Under these circumstances, a specific code value such as the value 255 will then indicate coding on two octets.

Finally, the target system, if it is an on-board multi-application system, comprises several compiled and compacted programs, i.e. several files FCC of the type described above. These programs must operate independently. This being the case and there being only one interpreter, it runs all the application programs loaded by the loading program. If two application programs use specific instructions, in the embodiment explained earlier in the description, it is possible that the compactor system will assign the same specific code $C_i$ for two series of different instructions.

In order to remedy such a situation and to enable the interpreter to distinguish between the two codes, the fields for the execution file FEX as described above in relation to FIG. 3a may be supplemented by a third parameter relating to an identification number for the application in question. This identification number will then also be stored for each assigned specific code listed in the table TAB-PRO. This latter parameter is in fact the reference for the program loaded at the same time as the file containing the table, allowing each specific instruction code $C_i$ to be associated with instruction sequences $S_i$ replaced by these latter for the application in question. When the interpreter is running the program application, it will then be able to single out the specific instructions relating to this application.

Clearly, the process described above enabling a multi-application on-board system to be run has the disadvantage of increased memory consumption because an additional field has to be allocated to relate back to the application number in question.

A more advantageous process will now be described with reference to FIG. 5.

Figure 5:
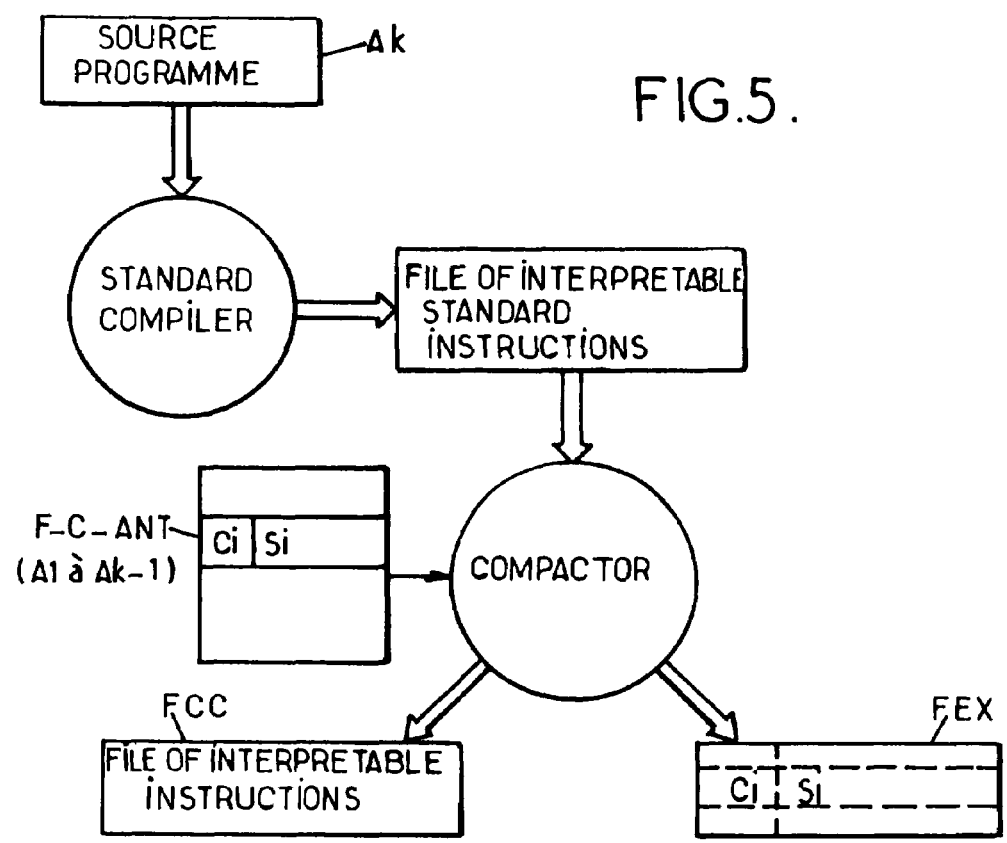
FIG. 5 shows an illustrative example of a specific method of compacting an intermediate object code program in which specific codes, relating to separate applications or intermediate object code programs, are updated.

FIG. 5 illustrates an on-board system such as a microprocessor card comprising several applications, shown by $A_1$ to $A_k$, the values $A_1$ to $A_k$ in fact constituting identification numbers for each application. To this end, when compacting any source program or application with a given identification number $A_1$ to $A_k$ for example, in accordance with the method proposed by the invention as explained earlier in the description, the target system, i.e. microprocessor card, transmits the contents of the memory MEM-SEQ along with the corresponding specific codes $C_i$ to the compactor. In effect, the target system re-computes a file of earlier specific coefficients, denoted by F-C-ANT, from the file or table TAB-PRO and the contents of the memory MEM-SEQ, relating to the applications $A_1$ to $A_{k-1}$. The file F-C-ANT ensures that each specific code $C_i$ is reciprocally matched with the sequence $S_i$ associated with it for all the applications $A_1$ to $A_{k-1}$. Under these conditions in a simplified but not restrictive embodiment, the file F-C-ANT may consist of a file of the same format as said file FEX. In the preferred compacting process illustrated in FIG. 5, the file F-C-ANT of earlier specific codes is then communicated to the compactor in order to teach the latter.

When compressing a new application with an identification number $A_k$, the compactor will look for all occurrences of instruction sequences $S_i$ already registered in the file F-C-ANT, i.e. in fact in the table TAB-PRO of the target system for the earlier applications $A_1$ to $A_{k-1}$. Whenever an occurrence is found, the compactor system replaces the corresponding sequence of instructions $S_i$ with the specific code $C_i$ for the corresponding specific instruction IS. Once this operation has been completed, the compactor system can then analyse the application bearing identification code $A_k$ and, of course, look for other occurrences with a view to creating additional specific instructions which have not yet been stored. The file F-C-ANT can then be updated. The decompression process described with reference to FIG. 5 may advantageously be run in particular as a means of compressing either programs being loaded on the on-board system for the first time or programs loaded on the on-board system in addition to other existing compacted programs.

In either of the two cases above, the compacting process proposed by the invention consists in storing the execution table relating to at least one compacted intermediate object code program, the first of these programs in the first hypothesis and one or more existing compacted programs in the second hypothesis, and then reading the stored execution table for every additional intermediate program and compressing every additional program, taking account of the specific instructions and codes stored in the execution table as described earlier in the description. Clearly, the compacted intermediate object code program thus created can not be run except on the target system, which provided the compactor system with the corresponding relevant file F-C-ANT previously.

When running the method of compacting an intermediate object code program, any on-board system such as a multi-application portable object comprising a microprocessor card, for example, and computing resources such as a microprocessor, a programmable memory, a read only memory and a language interpreter will have, as in FIG. 2c discussed earlier, at least one set of files stored in the programmable memory 18a for example, in addition to the table TAB-STD of standard codes representing an intermediate object code program stored at the level of the interpreter.

Accordingly, the corresponding portable object will have at least one compacted intermediate object code program, i.e. the file FCC illustrated in FIG. 2c. This file may be made up of an application as described above or may be a function such as a data encryption/decryption function or similar. This compacted intermediate object code file will, of course, consist of a series of specific instruction codes $C_i$ and standard instruction codes corresponding to the instruction codes of said intermediate object code program. The specific instruction codes $C_i$ correspond to sequences of successive standard instructions $S_i$ as mentioned earlier in the description.

Furthermore, as illustrated in FIG. 2c, an execution table allows a reciprocal link to be applied between each specific operating code $C_i$ and the sequence of successive standard instructions $S_i$ associated with this latter. All of these files enable the memory space occupied in the memory to be optimised, in particular the programmable memory 18a of the portable object.

As also illustrated in FIG. 2c, the execution table has at least one file of successive sequences corresponding to the specific instructions, this file being denoted by the memory MEM-SEQ, and a table, denoted by TAB-PRO, of specific instruction codes and addresses at which these specific instructions are embedded in the file of successive sequences.

The compacted intermediate object code program is then run as illustrated in FIG. 4.

A system for compressing an intermediate object code program enabling the compression method described earlier in the description to be run will now be explained with reference to FIGS. 6a and 6b.

Generally speaking, the compaction method proposed by the invention will be described as a combination of modules, these modules being implemented either by hardware means but preferably by software means, and the data flows between these modules explained.

Figure 6A:
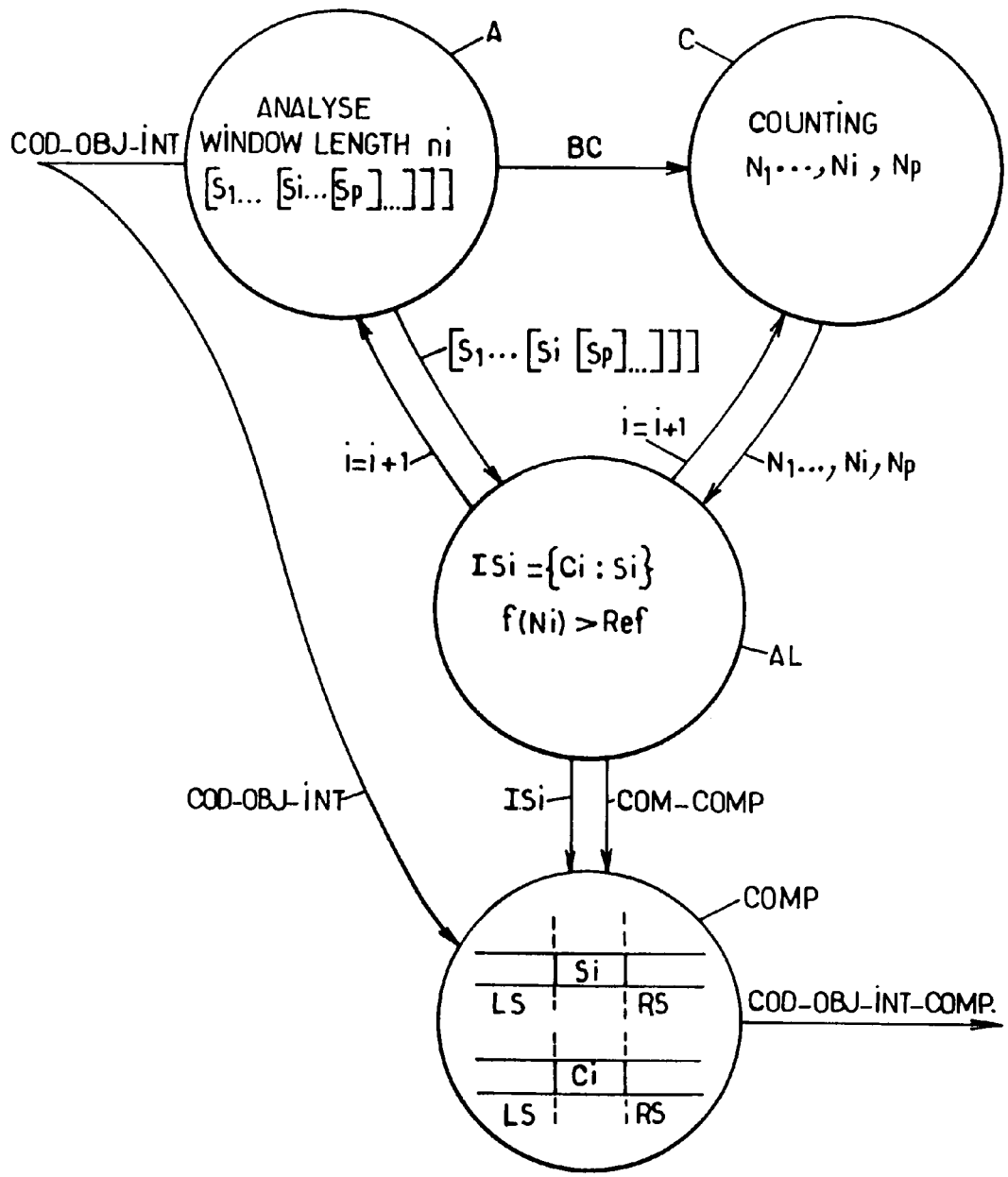
FIGS. 6a and 6b illustrate, in the form of functional elements, a system for compacting an intermediate object code program as proposed by this invention.

FIG. 6a illustrates the compaction system proposed by the invention, which comprises at least one module A for analysing all the directly executable instructions constituting the intermediate object code program, shown by COD-OBJ-INT. Generally speaking, the computer file supporting the intermediate object code program is regarded as a string of octets or character string and the operating mode of the compacting system proposed by this invention will be looked at from the point of view of the corresponding processing applied to the string.

Starting with said string of octets, the analysis module A is able to read the object code program COD-OBJ-INT, single out and establish a list of all the standard instruction sequences $S_i$ contained in said program. In FIG. 6a, the standard instruction sequences $S_1, S_{i-1}, S_i, S_{i+1}, \ldots S_p$, are therefore written in symbolic form in a list in accordance with the symbolic notation of the lists. Accordingly, the analysis module A may consist of a sliding window corresponding to a number $n_i$ of octets, this sliding window enabling the analysis of the sequence $S_i$ to be run as mentioned above with reference to table 1 of the description. The sliding window in fact distinguishes between each sequence $S_i$ by scrolling the string of octets relative to said window. Every time the sequence $S_i$ in question occurs, a counting bit BC is issued by the analysis module A.

As also illustrated in FIG. 6a, the compaction system proposed by the invention also has a module C for counting the number of occurrences in said object code program of each of the previously mentioned directly executable instruction sequences $S_i$. The counting module C may be provided in the form of a software module which counts the number of successive bits assigning a value of 1 to said counting bit BC. The counting module C enables the corresponding number of occurrences $N_1 \ldots N_{i-1}, N_i, N_{i+1} \ldots N_p$ of each sequence $S_1 \ldots S_{i-1}$ to $S_{i+1} \ldots S_p$ and so on to be stored. These can be stored in the form of a list.

Furthermore, as illustrated in FIG. 6a, a module AL is provided for allocating to at least one sequence of directly executable instructions $S_i$ a specific code $C_i$ associated with this sequence $S_i$ in order to generate a specific instruction, denoted by $IS_i$ in FIG. 6a, on the basis of a criterion whereby the function of at least the corresponding number of occurrences $N_i$ is higher than a reference value as mentioned earlier in the description.

If the function of at least the number $N_i$ is higher than the function value of the above-mentioned reference value, the module AL will issue a compaction command COM-COMP which may consist of one bit with a corresponding value 1 or 0.

Finally, the compaction system proposed by the invention has a compacting module strictly speaking, COMP, which receives on the one hand the file relating to said intermediate object code program COD-OBJ-INT and the counting command COM-COMP. The compacting module strictly speaking COMP in effect enables every occurrence of every sequence $S_i$ in said intermediate object code program, considered as a string of octets, corresponding to a specific instruction $IS_i$ to be replaced by the specific code $C_i$ associated with this sequence of instructions.

As regards the operating mode of the compacting module COMP as such, it should be pointed out that it may have a reading sub-module which uses a sliding window, similar to that of the analysis module, enabling the sequence of standard instructions $S_i$ in said string of octets to be located. In practice, when said sequence of standard instructions $S_i$ is located, as illustrated in FIG. 6a, the compacting module may have a left-hand partitioning and a right-hand partitioning sub-module for the sequence $S_i$ in question in order to generate a left string, denoted by LS, and a right string, denoted by RS. It may then have a concatenation module which uses the specific code $C_i$ constituting the specific instruction $IS_i$, so that the corresponding specific code $C_i$, considered as a string of octets, can be concatenated on the one hand, with the left chain LS for example, after which the unit thus formed is concatenated with the right chain RS, which ensures that the sequence $S_i$ will be replaced by the specific code $C_i$. The compacting module strictly speaking COMP thus issues a compacted intermediate object code program denoted by COD-OBJ-INT-COMP in FIG. 6a. Clearly, the compaction system illustrated in FIG. 6a enables the compaction process described above to be applied to the set of all the directly executable instruction sequences $S_i$ in question.

Figure 6B:
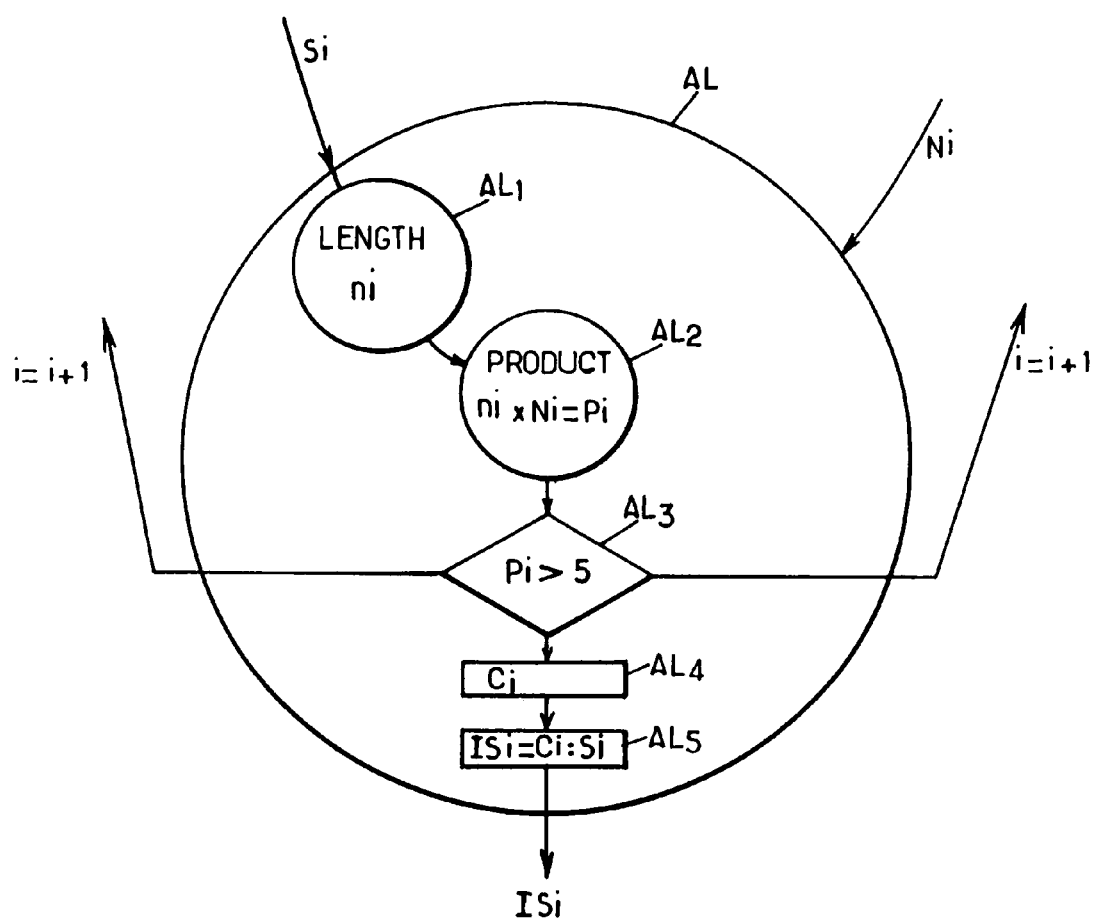

In one embodiment which is not restrictive, the allocation module AL may, as illustrated in FIG. 6b, have a module for computing the number of octets from the length $n_i$ of the instruction sequence $S_i$, this module being denoted by $AL_1$ in FIG. 6b. It may also have a computing module, shown by $AL_2$, to form the product of this length $n_i$ and the number of occurrences $N_i$ of this sequence $S_i$ of standard instructions. This product, written $P_i$, is representative of the compression gain for the sequence of directly executable instructions $S_i$ considered.

Furthermore, the allocation module AL may have a module, denoted by $AL_3$, for comparing this product $P_i$ with a given threshold value, S. The threshold value S may be determined experimentally. It may also be established on the basis of this experimental value in such a way that, for an intermediate object code program of a given length, it corresponds to a given percentage of this length.

If a negative response comes back from the comparison test run by the module $AL_3$, the rank i of each directly executable sequence of instructions $S_i$ is incremented by one unit and the new value of i is sent back to the analysis module A on the one hand and the counting module C on the other.

If a positive response comes back from the comparison test run by the module $AL_3$, a module $AL_4$ will establish a corresponding specific code $C_i$ and, finally, a module $AL_5$ will apply a reciprocal link so as to write the specific code $C_i$ and the relevant sequence of directly executable instructions $S_i$ to constitute the specific instruction $IS_i$.

The module $AL_4$ may be a compression software module enabling an initial value, for example the value 106 mentioned earlier in the description, to be used as a basis for allocating a corresponding value to the relevant corresponding sequence of instructions $S_i$. Each specific instruction $IS_i$ may then be written in the form of a corresponding list.

Real-time compression tests on the programs or applications contained in the microprocessor cards sold by BULL CP8 in France have shown that a compression gain of more than 33% can be obtained, which, when applying the compaction process to three applications on a mobile portable object, essentially represents a gain of one additional application for this type of object.

This compression gain was obtained under substantially normal conditions of usage by the user whilst the slowing-down caused by calling up macro instructions is not substantially more than 10% of the running time if no macro instructions are included, this slowing-down being inherent in successively calling up reading operations at the level of the table TAB-B-PRO and the file MEM-SEQ.

What is claimed is:

1. A method of compacting an intermediate program comprising a sequence of standard instructions, used in an on-board system, said on-board system being provided with a memory and a program language interpreter capable of turning the intermediate program into instructions of an object code that can be run by a microprocessor through said interpreter, said method comprising the steps of:
   a) searching through said intermediate program for identical sequences of successive standard instructions,
   b) subjecting said identical sequences of successive instructions to a comparison test to find a function, based on at least the number of occurrences of these sequences in said intermediate program, that is higher than a reference value,
   and, if the test returns a positive response, for each identical sequence of successive standard instructions which satisfies said test step,
   c) generating a new specific instruction by defining a specific operating code and associating said specific operating code with the sequence of successive standard instructions which satisfied said test,
   d) replacing each occurrence of each sequence of standard successive instructions in said intermediate program with said specific operating code associated with it to obtain a compacted intermediate program, consisting of a series of standard instructions and specific operating codes, and
   e) storing in said memory an execution table which enables a reciprocal link to be established between each specific operating code inserted and the sequence of successive standard instructions associated with said specific operating code,
   thereby enabling the memory space occupied by said compacted intermediate program to be optimized by storing only one occurrence of said identical sequences of successive standard instructions in said memory.

2. A method as claimed in claim 1, wherein said function is also a function of the size of each identical sequence of successive instructions.

3. A method as claimed in claim 1, wherein in order to compress a plurality of intermediate programs, said method also comprises the steps of:
   storing said execution table relating to at least one compacted intermediate program,
   and, for every additional intermediate program subjected to a compaction process:
   reading said stored execution table, and
   running the compaction process for every additional program, taking account of the specific codes and instructions stored in said execution table.

4. A method of running a compacted program comprising a succession of standard instructions and specific operating codes stored in a memory of an on-board system,
   said compacted program being obtained by applying a method of compacting an intermediate program comprising a sequence of standard instructions, used in said on-board system, said on-board system being provided with a memory and a program language interpreter capable of turning the intermediate program into instructions of an object code that can be run by a microprocessor through said interpreter;

said method comprising the steps of:

a) searching through said intermediate program for identical sequences of successive standard instructions;

b) subjecting said identical sequences of successive instructions to a comparison test to find a function, based on at least the number of occurrences of these sequences in said intermediate program, that is higher than a reference value;

and, if the test returns a positive response, for each identical sequence of successive standard instructions which satisfies said test step;

c) generating a new specific instruction by defining a specific operating code and associating said specific operating code with the sequence of successive standard instructions which satisfied said test;

d) replacing each occurrence of each sequence of standard successive instructions in said intermediate program with said specific operating code associated with it to obtain a compacted intermediate program, consisting of a series of standard instructions and specific operating codes; and e) storing in said memory an execution table which enables a reciprocal link to be established between each specific operating code inserted and the sequence of successive standard instructions associated with said specific operating code;

thereby enabling the memory space occupied by said compacted intermediate program to be optimized by storing only one occurrence of said identical sequences of successive standard instructions in said memory;

wherein said method for running the compacted program is performed by said microprocessor through said program interpreter for interpreting said standard instructions and said specific instructions, and comprises the steps of:

recognizing in said memory the existence of a stored execution table containing at least one sequence of successive instructions associated with a specific operating code by means of a reciprocal link;

calling up a command, via said program language interpreter, to read the successive standard instructions or specific operating codes of said compacted intermediate program and, in the presence of a specific operating code:

retrieving said sequence of successive instructions associated with said specific operating code from the memory by means of a read instruction and, in the presence of a standard instruction;

commanding the execution of said standard instruction by means of a read instruction.

5. A method as claimed in claim 4, wherein if a sequence of successive instructions associated with a specific operating code is called up, the current value of a program counter is incremented in a stack associated with the specific operating codes and a program pointer points to the first instruction of said sequence of specific instructions, after which, on running an instruction to end the sequence of specific instructions, said program counter is decremented and the execution process continues starting with the next instruction or specific operating code.

6. A method as claimed in claim 5, wherein the stack associated with the specific operating codes and the stack associated with the standard instructions are a single stack.

7. A multi-application on-board system comprising computing resources, a memory and language interpreter capable of turning an intermediate program into instructions which are executable by the computing resources through said language interpreter, wherein said multi-application on-board system also at least comprises:

one table of standard codes constituting said intermediate program stored in a memory to which said language interpreter is able to access to;

at least one compacted intermediate program constituting an application and consisting of a series of specific instruction codes and standard instruction codes, said specific instruction codes corresponding to sequences of successive standard instructions;

an execution table stored in a memory to which said language interpreter is able to access to, and enabling a reciprocal link to be established between an operating specific instruction code and the sequence of successive standard instructions associated with the latter, said at least one compacted intermediate program and said execution table being stored in said memory, thereby enabling the memory space occupied by said compacted intermediate program to be optimized by storing in said programmable memory only one occurrence of said identical sequences of successive instructions.

8. An on-board system as claimed in claim 7, wherein said execution table comprises at least:

a file of successive sequences corresponding to said specific instruction codes;

a table of specific instruction codes and addresses at which said specific instruction codes are embedded in the table of successive sequences.

9. An on-board system as claimed in claim 8, wherein said file of successive sequences corresponding to said specific instruction codes and said table of specific instruction codes are stored in a programmable memory of said on-board system.

10. A compaction system for an intermediate program, said intermediate program consisting of a series of standard instructions which can be executed by a target unit, wherein said system comprises at least:

means for analyzing all the standard executable instructions enabling, by means of a reading process, said intermediate program to distinguish between and establish a list of all the sequences of executable standard instructions contained in said intermediate program;

means for counting the number of occurrences in this intermediate program of each of the sequences of executable standard instructions forming part of said list;

means for allocating to at least one sequence of executable standard instructions a specific code associated with this sequence of executable standard instructions in order to generate a specific instruction;

means for replacing, in said intermediate program, each occurrence of said sequence of executable standard instructions with said specific code associated with this sequence of executable standard instructions, representative of said specific instruction, thereby enabling a compacted program to be generated comprising a succession of executable standard instructions and specific instructions.

11. A compaction system as claimed in claim 10, wherein said means for allocating to at least one sequence of executable standard instructions a specific code associated with said sequence of executable standard instruction in order to generate a specific instructions comprises at least:

means for computing the value of a function based on at least the length of and number of occurrences of said sequence of executable standard instructions, said function being representative of the compression gain for said sequence of executable standard instructions;

means for comparing the value of said function with a threshold value and, if said comparison returns a positive response;

means for writing to a file, with a reciprocal link, a specific code and this sequence of executable standard instructions in order to constitute said specific instruction.

* * * * *